United States Patent [19]

Bretz et al.

[11] Patent Number: 5,491,972
[45] Date of Patent: Feb. 20, 1996

[54] COMBINATION IGNITER AND FUEL ATOMIZER NOZZLE ASSEMBLY FOR A GAS TURBINE ENGINE

[75] Inventors: David H. Bretz, West Des Moines; Neal E. Gohring, Clive, both of Iowa

[73] Assignee: Delavan Inc, West Des Moines, Iowa

[21] Appl. No.: 225,025

[22] Filed: Apr. 8, 1994

[51] Int. Cl.$^6$ .................................................. F02C 7/264
[52] U.S. Cl. ................................................. 60/39.821
[58] Field of Search .................. 60/39.821, 39.826, 60/39.827; 239/424.5, 423, 418; 431/266; 123/297

[56] References Cited

U.S. PATENT DOCUMENTS

| | | | |
|---|---|---|---|
| 3,057,159 | 10/1962 | Bennedict | 60/39.827 |
| 3,073,121 | 1/1963 | Baker et al. | 431/266 |
| 4,023,351 | 5/1977 | Beyler et al. | 60/39.827 |
| 4,215,979 | 8/1980 | Morishita | 60/39.827 |
| 4,938,019 | 7/1990 | Angell et al. | 60/39.827 |
| 5,000,159 | 3/1991 | Clarke et al. | 431/266 |
| 5,085,040 | 2/1992 | Tilston | 60/39.827 |

FOREIGN PATENT DOCUMENTS 2032519   5/1980   United Kingdom ............... 60/39.827

OTHER PUBLICATIONS

Lefebvre, Gas Turbine Combustion, Hemisphere Publishing Group (McGraw Hill), 1983, pp. 221–232.

*Primary Examiner*—Timothy S. Thorpe
*Attorney, Agent, or Firm*—Howard S. Reiter

[57] ABSTRACT

An igniter and fuel atomizer nozzle assembly in a gas turbine engine includes an igniter in which a fuel conduit is positioned in a passageway in the igniter between its housing and its electrode for discharging atomized start up fuel from the end of the igniter housing closely proximate to the ignition spark generated by the electrode.

25 Claims, 2 Drawing Sheets

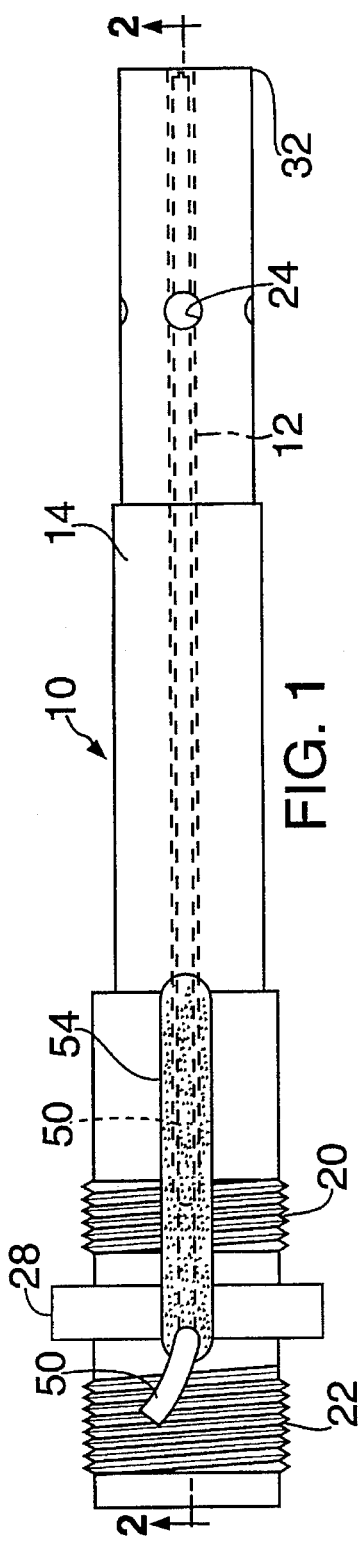
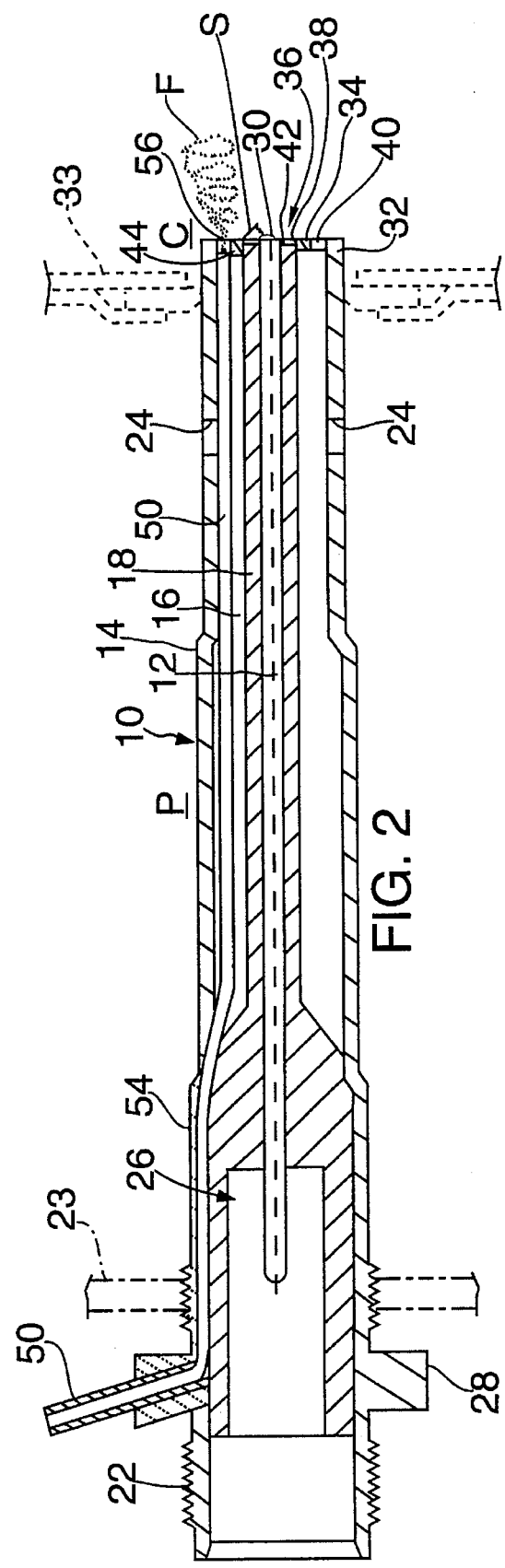

5,491,972

COMBINATION IGNITER AND FUEL ATOMIZER NOZZLE ASSEMBLY FOR A GAS TURBINE ENGINE

BACKGROUND AND SUMMARY OF THE INVENTION

The present invention is directed to an igniter nozzle for gas turbines and, more particularly, to a combination igniter and fuel atomizer nozzle assembly for the start up of gas turbines.

A wide variety of fuel atomizer and igniter arrangements have been employed in the past for the ignition of fuel for the start up of gas turbines. In one such arrangement the fuel is admitted to the turbine combustion chamber through atomizers which are used to deliver fuel throughout the operating range of the turbine engine. This fuel is atomized and is directed toward a conventional igniter. The igniter typically comprises an electrode which is surrounded by an insulator, and by an electrically conductive housing which surrounds the insulator. The ends of the electrode and of the housing open into the combustion chamber where fuel is atomized during normal turbine operation, and the housing extends through the air plenum of the turbine to the gas generator case, to utilize air cooling effects. In this arrangement the igniter is spaced from the normal-operation fuel atomizer in the combustion chamber. The atomized fuel is directed toward the igniter, and when electrical energy is imparted to the electrode, a spark jumps from the electrode to the housing to ignite the fuel proximate the end of the igniter. The flame produced at the igniter upon ignition is then propagated as a flame front back to the main-operation fuel atomizer to ignite the fuel as it issues from the main-operation atomizer.

One disadvantage of this arrangement is that movement of discharge air, used for cooling the igniter, tends to blow atomized fuel droplets away from the end of the igniter, extending the time required for ignition and substantially increasing the amount of start-up smoke generation. This slow ignition is also disadvantageous particularly in aircraft engines where it is desired to restart a flameout at high altitudes at which the start up is further hampered by cold fuel and relatively high air velocities. Moreover, in this arrangement relatively high electrical energies are required due to the spacing of the atomizer and igniter in the combustion chamber. High electrical energies substantially decrease the life of the igniter.

Another arrangement has also been employed in the past in which the igniter is incorporated into the fuel atomizer housing. However, this arrangement results in a large, cumbersome and heavy atomizer housing, and as a result, its use is essentially limited to land operating turbines. Moreover, this arrangement, because it is incorporated into the normal main-operation atomizer housings, subjects the igniter to continuous exposure to the flame even after start up is achieved, which reduces the life of the igniter and subjects the igniter to carbon buildup.

In the igniter and fuel atomizer nozzle assembly and method of the present invention a fuel atomizer nozzle is incorporated directly into the igniter housing, and the start up fuel is atomized closely proximate the spark which is generated by the igniter. Once combustion has been initiated in the combustion chamber, the start up fuel flow to the atomizer in the igniter may be terminated, and the atomizer can be purged to minimize further carbon buildup. Once ignition has occurred, the normal operation of the turbine is accomplished by way of the normal main-operation fuel atomizers.

The assembly and method of the present invention thereby overcomes most if not all of the aforementioned disadvantages of the aforementioned prior start up arrangements. In the present invention the atomized fuel for start up and the igniter spark are positioned in extremely close proximity to each other which results in substantially improved ignition. This configuration results in faster ignition and simplifies the main fuel system because there is no longer any need to incorporate start up capabilities in the main fuel nozzle which is designed for normal operation versus start up. The faster ignition also substantially reduces start up smoking and improves the ignition under high altitude start up conditions when the fuel is cold and the air velocity is high. The extremely close proximity of the start up atomized fuel and the spark may also reduce the electrical energy requirements of the igniter and, therefore, substantially increases the life of the igniter. Because the start up atomizer in the igniter is only needed for start up and can be purged of its fuel after ignition, carbon buildup on the igniter may also be substantially reduced. The assembly of the present invention is capable of achieving these substantial advantages with at most only a minimum reconfiguration of a standard igniter assembly, and because it is extremely compact it may be readily utilized in aircraft turbines and not just land use turbines.

In one principal aspect of the present invention, a combination igniter and fuel atomizer nozzle assembly comprises an igniter which includes an elongate conductive electrode and an elongate conductive housing surrounding the electrode so as to define an elongate passageway in the housing between the electrode and the housing. The ends of the electrode and the housing are positioned proximate to each other to define a gap through which a spark will jump between the ends of the housing and the electrode when electrical energy is imparted to either the electrode or the housing. A fuel atomizer nozzle includes a fuel discharge orifice proximate the ends of the electrode and the housing and adjacent to the gap for the purpose of discharging finely atomized fuel adjacent the gap. Also, a fuel conduit is in the passageway for communicating fuel to the orifice for discharge therefrom.

In another principal aspect of the present invention, the orifice is in the passageway of the igniter housing.

In still another principal aspect of the present invention, the atomizer nozzle is a simplex nozzle.

In still another principal aspect of the present invention, an electrically insulative material is in said passageway and surrounds the electrode and is between the electrode and the conduit and housing.

In still another principal aspect of the present invention, the fuel discharge orifice is between the aforementioned insulative material and the housing.

In still another principal aspect of the present invention, the end of the housing includes a cap, and the cap has an opening therein through which the end of the electrode is exposed. The perimeter of the opening is spaced from the end of the electrode to at least in part define the gap, and the orifice is between the elongate housing and the perimeter of the opening.

In still another principal aspect of the present invention, one or more second openings are located in the cap between the perimeter of the opening through which the electrode is exposed and the elongate housing, and the orifice discharges the finely atomized fuel through at least one of these second openings.

In still another principal aspect of the present invention, a method of initiating combustion start up in a gas turbine engine comprises passing combustible fuel through the elongate housing of an igniter, atomizing the fuel adjacent the end of the igniter which is positioned in the combustion chamber of the gas turbine engine, discharging the atomized fuel from the end of the igniter housing and into the combustion chamber, and imparting electrical energy to an electrode in the igniter housing to initiate an electrical spark at the end of the electrode and igniter housing and closely proximate the location from which the atomized fuel is discharged from the end of the igniter housing to ignite the atomized fuel.

In still another principal aspect of the present invention, the fuel is atomized before it is discharged from the end of the igniter housing.

In still another principal aspect of the present invention, the location at which the fuel is initially atomized is proximate to but spaced from the path of the spark.

In still another principal aspect of the present invention, the fuel remaining in the atomizer housing is purged once ignition of the fuel has been initiated.

In still another principal aspect of the present invention, air is passed through the igniter housing and is discharged from the end of the housing.

These and other objects, features and advantages of the present invention will be more clearly understood upon consideration of the detailed description of the preferred embodiment of the invention which will be described to follow.

BRIEF DESCRIPTION OF THE DRAWING

In the course of this description reference will frequently be made to the attached drawing in which:

FIG. 1 is an overall plan view of the igniter and fuel atomizer nozzle assembly which is constructed in accordance with the principles of the invention;

FIG. 2 is a cross-sectioned side elevation view of the igniter and fuel atomizer nozzle assembly, as viewed substantially along line 2—2 of FIG. 1;

DESCRIPTION OF THE PREFERRED EMBODIMENT

Figure 3:
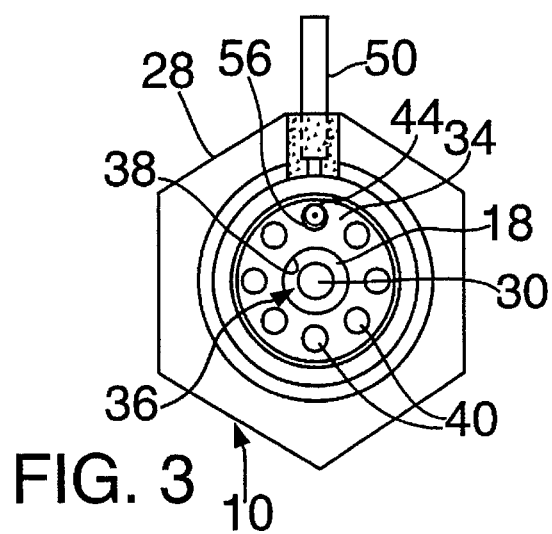
FIG. 3 is an end view of the igniter and fuel atomizer nozzle assembly, as viewed substantially along line 3—3 of FIG. 1.

A preferred embodiment of the igniter and fuel atomizer nozzle assembly as shown in the drawing includes an igniter, generally 10. The igniter 10 has an elongate electrically conductive electrode 12, as best seen in FIG. 2, and an elongate housing 14 which is also formed of electrically conductive material. The housing 14 is spaced from the electrode 12 to define an elongate passageway 16 between the electrode 12 and the housing 14. An elongate electrically insulative material 18 closely surrounds the electrode 12 and is also positioned in the passageway 16 between the electrode 12 and the interior surface of the housing 14, as best seen in FIG. 2.

The left end of the housing 14, as viewed in FIGS. 1 and 2, includes suitable couplings, such as threads 20 and 22. Threads 20 are for mounting the igniter in the outer wall 23 of the gas turbine air plenum P, as seen in FIG. 2, so that air circulates about the housing to cool the housing and also enters the passageway 16 in the housing through openings 24 in the housing. In addition, suitable means, generally 26, mounts the left end of the electrode 12 as viewed in FIG. 2 and the electrode is coupled by threads 22 to a source of electrical energy which is to be imparted to the electrode. The electrode mounting means 26 and source of electrical energy will not be described in detail as they are conventional in gas turbine igniters. The left end of the housing 14, as viewed in FIGS. 1 and 2, may also include a suitable hex head fitting 28 to facilitate the mounting of the igniter in the gas turbine air plenum wall 23.

The right end 30 of the electrode 12, as viewed in FIG. 2, terminates proximate to the right end 32 of the housing. The right end of the igniter, as viewed in the drawing, extends through the combustion chamber wall 33 and is positioned in the combustion chamber C. The housing 14 is preferably capped with a cap 34 at its end 32, as best seen in FIG. 2. The cap 34 may be attached to the housing end 32, or preferably it is formed integrally with the housing 14.

The cap 34 includes an enlarged center opening 36 through which the end 30 of the electrode 12 is exposed, as well as the end of the insulative material 18. The perimeter 38 of the opening 36 is thereby spaced from the end 30 of the electrode 12 to define a gap between the electrode and opening perimeter through which a spark will jump between the end 30 of the electrode 12 and the cap at its opening perimeter 38 when the electrode is electrically energized. The cap 34 also includes a plurality of spaced openings 40 to permit air from the air plenum P which passes through the passageway 16 from the openings 24 in the housing 14 to issue from the end of the housing and into the combustion chamber C. The end of the insulative material 18 also preferably is recessed at 42 from the exterior face of the cap 34 to clear the spark path between the electrode end 30 and the opening perimeter 38 of the cap 34.

Figure 4:
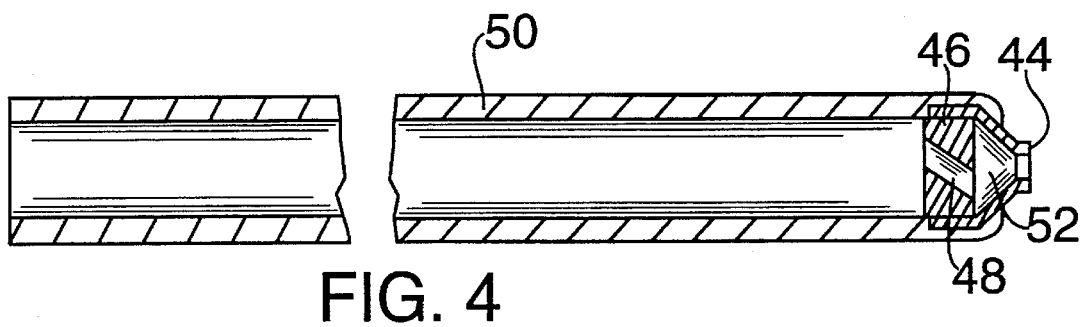
FIG. 4 is an enlarged view of the fuel atomizer nozzle, as shown in the FIG. 2.

In the assembly of the present invention the fuel atomizer nozzle is positioned in the passageway 16 within the housing 14, as best seen in FIG. 2. It comprises an atomizing orifice member 44, as best seen in FIG. 4, which has a swirl imparting plate 46 positioned upstream of the orifice. The swirl plate 46 preferably has one or more tangential passages 48 extending through the plate so that fuel which is conducted through a fuel conduit 50 will pass through the passages 48 which will impart a swirling motion to the fuel as it is discharged into a swirl chamber 52, and the swirling fuel F is thence discharged through the orifice 44. The conduit 50 also passes through the passageway 16 in the housing 14 and accesses the passageway through a slotted opening 54 in the left end of the housing, as viewed in FIGS. 1 and 2, so that the conduit may be coupled with a source of fuel. The slotted opening 54 is sealed with a suitable heat resistant material, such as a ceramic filler after the fuel conduit and atomizer have been positioned in the housing 14.

The atomizer orifice 44 is positioned in alignment with one of the openings 56 of the several openings 40 in the cap 34, as best seen in FIGS. 2 and 3. Thus, the orifice 44 is radially and eccentrically positioned relative to the end 30 of the electrode 12 and the spark S as shown in FIGS. 2 and 3. The orifice 44 is also preferably slightly recessed from the outermost face of the cap 34, as seen in FIG. 2, so that the fuel initially issues from the orifice 44 before it is discharged from the cap 34. Thus, orifice 44 is slightly spaced from the spark path and, thereby, is somewhat protected from the erosive effect of the sparking to prolong the life of the orifice 44. It will be seen that by the provision of the swirl plate 46 and swirl chamber 52, the preferred nozzle of the present invention is what is known in the industry as a simplex nozzle.

Although it is believed that the operation of the igniter and fuel atomizer nozzle assembly and method of the present invention will be evident to those skilled in the art from the foregoing description, a brief description of the operation follows.

When it is desired to start up the gas turbine, fuel is admitted through the conduit 50 which passes through the passageway 16 of the igniter housing 14. Swirl is imparted to the fuel by the swirl plate 46, as shown in FIG. 4, and the swirling fuel issues from the tangential passages 48 into the swirl chamber 52, through the orifice 44, and finally through the opening 56 in the cap 34 and into the combustion chamber C as a swirling cone F of finely atomized fuel. The timing of the fuel as it first issues from the opening 56 in the cap 34 may be accurately coordinated with the imposition of electrical energy to the electrode 12 by well known controls which are not described herein. As the fuel issues from the opening 56, the electrical energy imparted to the electrode 12 will cause a spark S to jump between the end 30 of the electrode 12 and to the perimeter 38 of the opening 36 in the cap 34. This spark is in extremely close proximity to the fuel F issuing from opening 56, and will cause it to ignite. At substantially the same time, fuel will be passed to the main operation atomizers of the engine which are used during its normal operation. The now ignited fuel from the orifice 44 will ignite the main atomized fuel, and the gas turbine engine will start up.

Once start up has been initiated, the fuel supply to conduit 50 and the electrical energy to the electrode 12 may be terminated. If desired, the fuel remaining in conduit 50 in the igniter passageway 16 may be purged from conduit 50 to minimize carbon buildup and prolong the life of the assembly. It will also be seen that because the orifice 44 is preferably slightly recessed behind the opening 56 of the cap 34, fouling during normal engine operation will be minimized and that the orifice 44 will be protected from the spark S during start up. This also prolongs the life of the assembly of the present invention.

From the foregoing description it will be appreciated that improved and faster ignition is made possible by the assembly and method of the present invention, thus minimizing engine smoking on start up and substantially improving ignition at high altitudes when the fuel is cold and the air velocity is high. This is made possible by the positioning of the start up fuel atomizer within the igniter housing and extremely close to the spark. The assembly and method of the present invention also enjoys simplicity, compactness and light weight, particularly over the prior arrangements in which the igniter is positioned in the main normal operation atomizer housings. The latter arrangements are quite cumbersome and have only found at best limited application in land, rather than aircraft use because of this. Conversely, due to the compactness and light weight of the assembly of the present invention, it is particularly well adapted to aircraft use. Moreover, the assembly and method of the present invention permits a substantial reduction in the electrical energy required for start up and, thereby, substantially increases the life of the igniter. It will also be appreciated that the assembly of the present invention may be incorporated into a standard igniter with a minimum of reconfiguration of the igniter.

It will be understood that the preferred embodiment of the present invention which has been described is merely illustrative of the principles of the present invention. Numerous modifications may be made by those skilled in the art without departing from the true spirit and scope of the invention.

We claim:

1. A combination igniter and fuel atomizer nozzle assembly for a gas turbine, comprising:

an igniter, said igniter including an elongate conductive electrode and an elongate conductive housing surrounding said electrode and defining an elongate air passageway in said housing between said electrode and said housing, an end of said electrode and said housing being positioned proximate to each other to define a gap through which a spark will jump between the ends of said housing and electrode when electrical energy is imparted to one of said electrode and housing, and means for communicating air to said air passageway during operation of the turbine, and a liquid fuel atomizer nozzle, said atomizer nozzle including a fuel discharge orifice proximate the ends of said electrode and said housing and adjacent said gap for discharging finely atomized liquid fuel adjacent said gap, and a fuel conduit in said air passageway and communicating with said fuel discharge orifice to communicate fuel to said orifice for atomization and discharge therefrom.

2. The assembly of claim 1, wherein said orifice is in said passageway.

3. The assembly of claim 1, wherein said atomizer nozzle is a simplex nozzle.

4. The assembly of claim 1, including an electrically insulative material in said passageway surrounding said electrode and between said electrode and said conduit and housing.

5. The assembly of claim 4, wherein said orifice is between said insulative material and said housing.

6. The assembly of claim 5, wherein said atomizer nozzle is a simplex nozzle.

7. The assembly of claim 1, wherein the end of said housing includes a cap, said cap having an opening therein through which the end of said electrode is exposed, the perimeter of said opening being spaced from the end of said electrode to at least in part define said gap, and said orifice is between said elongate housing and the perimeter of said opening.

8. The assembly of claim 7, including a second opening in said cap between said perimeter of the first mentioned opening and said elongate housing, said orifice discharging the finely atomized fuel through said second opening.

9. The assembly of claim 8, wherein said atomizer nozzle is a simplex nozzle.

10. The assembly of claim 8, wherein said orifice is recessed in said second opening.

11. The assembly of claim 8, including a plurality of said second openings, and said orifice discharges the finely atomized fuel through at least one of said second openings.

12. The assembly of claim 7, including an electrically insulative material in said passageway surrounding said electrode and between said electrode and the perimeter of said opening adjacent said gap.

13. The assembly of claim 12, wherein said atomizer nozzle is a simplex nozzle.

14. The assembly of claim 12, including a second opening in said cap between said perimeter of the first mentioned opening and said elongate housing, said orifice discharging the finely atomized fuel through said second opening.

15. The assembly of claim 14, wherein said orifice is recessed in said second opening.

16. The assembly of claim 14, including a plurality of said second openings, and said orifice discharges the finely atomized fuel through at least one of said second openings.

17. The assembly of claim 1, wherein said liquid fuel atomizer nozzle includes means to impart a swirling motion to the atomized liquid fuel.

18. The assembly of claim 1, wherein the atomized fuel is discharged from said orifice of said fuel atomizer nozzle at a location spaced radially from and eccentrically to the end of said elongate conductive electrode.

19. The assembly of claim 18, wherein the atomized fuel is dicharged from said orifice of said fuel atomizer nozzle at a location spaced radially from and eccentrically to said gap.

20. The assembly of claim 1, wherein the atomized fuel is discharged from said orifice of said fuel atomizer nozzle at a location spaced radially from and eccentrically to said gap.

21. A combination igniter and fuel atomizer nozzle assembly, comprising:

an igniter, said igniter including at elongate conductive electrode and an elongate conductive housing surrounding said electrode, an end of said electrode and said housing being positioned proximate to each other to define a gap through which a spark will jump between the ends of said housing and electrode when electrical energy is imparted to one of said electrode and housing; and a fuel atomizer nozzle, said atomizer nozzle including a fuel discharge orifice proximate the ends of said electrode and said housing and adjacent said gap for discharging finely atomized fuel adjacent said gap, and wherein the atomized fuel is discharged from said orifice of said fuel atomizer nozzle at a location spaced radially from and eccentrically to the end of said elongate conductive electrode.

22. The assembly of claim 21, wherein the atomized fuel is discharged from said orifice of said fuel atomizer nozzle at a location spaced radially from said gap.

23. The assembly of claim 22, wherein said location is also eccentric to said gap.

24. The assembly of claim 21, wherein said liquid fuel atomizer nozzle includes means to impart a swirling motion to the atomized liquid fuel.

25. The assembly of claim 24, wherein said liquid fuel atomizer nozzle is a simplex nozzle.

\* \* \* \* \*